United States Patent
Conway et al.

(10) Patent No.: US 6,795,518 B1
(45) Date of Patent: Sep. 21, 2004

(54) INTEGRAL PWR WITH DIVERSE EMERGENCY COOLING AND METHOD OF OPERATING SAME

(75) Inventors: Lawrence E. Conway, Hookstown, PA (US); Mario D. Carelli, Greensburg, PA (US); Carlo V. Lombardi, Milan (IT); Luca Oriani, Milan (IT); Marco Ricotti, Sesto San Giovanni (MI) (IT)

(73) Assignees: Westinghouse Electric Company LLC, Pittsburgh, PA (US); Polytechnic of Milan, Milan (IT)

( * ) Notice: Subject to any disclaimer, the term of this patent is extended or adjusted under 35 U.S.C. 154(b) by 13 days.

(21) Appl. No.: 09/803,418

(22) Filed: Mar. 9, 2001

(51) Int. Cl.[7] ............................................. G21C 9/012

(52) U.S. Cl. ..................... 376/283; 376/293; 376/294; 376/295; 376/296; 376/298; 376/299; 376/391; 376/402; 376/403; 376/404; 376/405; 376/406

(58) Field of Search .................................. 376/283, 293, 376/294, 295, 296, 298, 299, 391, 402, 403, 404, 405, 406, 282

(56) References Cited

U.S. PATENT DOCUMENTS

| | | | | |
|---|---|---|---|---|
| 3,718,539 A | * | 2/1973 | West et al. | 376/283 |
| 3,888,734 A | * | 6/1975 | Juric | 376/298 |
| 3,941,187 A | * | 3/1976 | Jabsen et al. | 165/157 |
| 4,072,563 A | * | 2/1978 | McDonald et al. | 376/406 |
| 4,289,196 A | * | 9/1981 | Jabsen et al. | 165/83 |
| 4,478,784 A | * | 10/1984 | Burelbach | 376/298 |
| 4,752,433 A | * | 6/1988 | Altman et al. | 376/230 |
| 4,753,771 A | | 6/1988 | Conway et al. | 376/282 |
| 5,043,135 A | | 8/1991 | Hunsbedt et al. | 376/299 |
| 5,049,353 A | | 9/1991 | Conway et al. | 376/293 |
| 5,053,190 A | * | 10/1991 | Gardner et al. | 376/366 |
| 5,089,218 A | * | 2/1992 | Gardner et al. | 376/406 |
| 5,102,616 A | * | 4/1992 | Gardner et al. | 376/282 |
| 5,102,617 A | | 4/1992 | Gluntz et al. | 376/283 |
| 5,106,571 A | | 4/1992 | Wade et al. | 376/282 |
| 5,180,543 A | | 1/1993 | Conway et al. | 376/282 |
| 5,255,296 A | * | 10/1993 | Schultz | 376/299 |
| 5,268,943 A | | 12/1993 | Corletti et al. | |
| 5,278,876 A | * | 1/1994 | Sawabe | 376/205 |
| 6,259,760 B1 | * | 7/2001 | Carelli et al. | 376/346 |

FOREIGN PATENT DOCUMENTS

| | | | |
|---|---|---|---|
| EP | 0476563 | * | 9/1991 |
| GB | 2237441 | * | 5/1991 |

OTHER PUBLICATIONS

Cinotti et al, "The inherently safe immersed (ISIS) reactor", Nuclear Enginerring and Design, 143, (1993), pp 295–300.*
Twilley, "Framatome ANP's SWR 100 reactor design", Nuclear News, Sep. 2002, pp 36–40.*
Mitenkov et al, "New generation nuclear power units of PWR type integral reactors", IAEA–TECHDOC–977, 1977, 25–34 (IAEA Vienna), pp25–34.*

(List continued on next page.)

*Primary Examiner*—Michael J. Carone
*Assistant Examiner*—John Richardson

(57) ABSTRACT

Passive emergency cooling in response to a loss of coolant accident (LOCA) in a PWR, having an integral reactor pressure vessel incorporating the steam generators and housed in a small high pressure containment vessel, is provided by circulating cooling water through the steam generators and heat exchangers in an external tank to cool the reactor vessel at a rate sufficient to lower the pressure in the reactor vessel below that in containment to reverse mass flow out of the reactor vessel and keep the reactor core covered without the addition of makeup water. Suppression tanks inside the small high pressure containment structure limit peak blowdown pressure in containment and provide flood-up water and gravity fed makeup water to cool the core. Diverse cooling is provided by natural circulation of air, and if needed, water, over the spherical containment structure.

15 Claims, 5 Drawing Sheets

OTHER PUBLICATIONS

Cinotti et al, "Steam Generator of the international reactor innovative and secure" Proceedings of ICONE 10, Arlington, VA, USA, Apr. 2002, pp. 1–8.*

Carelli et al, "IRIS—an integrated international approach to design and deploy a new generation reactor" IAEA –SR–218, 1997, Paper No. 35, pp1–9.*

Longo et al, "The desogn goals and significant features of the Safe Integral Reactor", Trans Am Nuc Soc, 1989, Paper No. 59, 204–205.*

Ishida et al, "Carem Project Development", IAEA–SR–218/2pp 10–11.*

Matzie et al, "Design of the Safe Integral Reactor", Nuclear Enginerring and Design 136, (1992) pp 78–83.*

K.R. Teare, *SIR—an imaginative way ahead*, Monitor, Nuclear Engineering International, Jun., 1989, pp. 32–34.

F.M. Mitenkov, et al., *New generation medium power nuclear station with VPBER–600 passive safety reactor plant*, Elsevier, Nuclear Engineering and Design 173, 1997, pp. 99–108.

* cited by examiner

INTEGRAL PWR WITH DIVERSE EMERGENCY COOLING AND METHOD OF OPERATING SAME

BACKGROUND OF THE INVENTION

1. Field of the Invention

This invention relates to a pressure water reactor (PR) with passive emergency cooling, and a method of operating the PWR in response to a loss of coolant accident (LOCA). More particularly, it relates to a PWR with a integral reactor pressure vessel in which the steam generators are contained within the pressure vessel, and which is provided with diverse arrangements for core and containment cooling and depressurization.

2. Background Information

PWRs have a reactor core of fissionable material housed in a reactor pressure vessel. In traditional commercial PWRs the reactor coolant, in the form of light water, is passed through the reactor core where it is heated by the fission reaction, and is then circulated in primary loops through steam generators. Cooled water from the steam generators is returned to the reactor pressure vessel and delivered to the reactor core inlet. The steam generators utilize the heat to generate steam that is delivered in secondary piping loops to a turbine generator to generate electricity.

The reactor pressure vessels and the steam generators of the PWR are housed in a containment structure that provides a barrier to the release of radioactivity. One of the concerns with a PWR is the possibility of a LOCA (loss of coolant accident) as the reactor coolant not only serves as a heat transfer medium, but also prevents the reactor core from overheating. A principal concern is a large LOCA that would result from the rupture of one of the large diameter pipes circulating reactor coolant through the steam generators. Such a leak would rapidly deplete coolant available to cover the reactor core as the pressurized coolant flashes to steam in addition to pouring through the rupture. Traditionally, the response to a large LOCA has been the injection of make up water to keep the core covered with water and cooled in order to remove heat that continues to be generated due to radioactive decay heat from the products of the fission reaction.

The trend is to provide passive systems, that is systems not requiring operator action or components requiring energization or components that once actuated require no additional energization or repositioning, to enhance reliability and safety. Several proposals have been made to integrate the steam generators into the reactor vessel. By placing the steam generators in the reactor pressure vessel, the principal cause of large size LOCAs is eliminated with the elimination of the large diameter piping between the reactor pressure vessel and the external steam generators.

There is still the potential for small or medium size LOCAs that must be addressed. One of the proposed integrated reactor designs, known as SIR (Safe Integral Reactor), utilizes a pressure suppression system as part of containment. In the event of a LOCA, coolant released as steam is quenched in water contained in a group of tanks. These tanks are cooled by natural circulation of ambient air. The containment is thus composed of the reactor cavity, a small dome structure over it, and the pressure suppression tanks and connection manifold. The quenching of the steam in the suppression tanks is designed to remove steam from the containment and thus to lower containment and reactor pressure. In order to replace water and water that flashes to steam and discharged from the reactor pressure vessel, steam injectors using steam from the integral reactor pressure vessel inject water from the suppression tanks into the reactor pressure vessel. The SIR circulates cooling water through an external heat exchanger and the secondary side of the steam generators during normal cool down after the turbine bypass system becomes ineffective, and this system appears to be sized only to absorb this normal decay heat at higher reactor pressures and temperatures.

A second integral reactor proposed by a Russian group houses the reactor pressure vessel containing the reactor core and steam generators in a small guard-vessel designed to withstand pressures from a LOCA up to 4 MPa. This system is directed toward maintaining sufficient core cooling by limiting the volume of the space available for escaping coolant and allowing the pressure to increase sufficiently to limit vaporization of coolant. The small guard vessel, and an extension housing other supporting equipment including condensers to limit the peak pressure that occurs and to provide long term pressure reduction capability, are both housed in a large containment structure. This integral reactor system also has heat removal loops connected to the steam generators providing passive heat removal in an emergency in addition to the above mentioned heat exchangers.

There is room for improvement in the structure and operation of PWRs with passive emergency cooling.

SUMMARY OF INVENTION

This invention is directed to a PWR, and a method of operating the PWR, employing an integral reactor vessel and having diverse emergency cooling systems that provide both core cooling and containment cooling following a LOCA. As one aspect of the invention, the PWR has a containment structure that allows the pressure in containment following a LOCA to rise while a heat exchanger connected to the secondary circuit of the steam generators in the reactor pressure vessel provides cooling of the reactor pressure vessel. The containment structure and the heat exchanger are sized to reduce the pressure in the reactor pressure vessel below the pressure in the containment structure to limit and actually reverse mass flow from the reactor pressure vessel within no more than about 3 hours following the LOCA without the need to add makeup water to the reactor pressure vessel in order to keep the reactor core covered with water and cooled. Thus, this arrangement results in the reduction in pressure within the containment structure without directly providing cooling of this structure and by condensing steam within the reactor pressure vessel replenishes the supply of water needed to cover and cool the reactor core. Preferably, the containment structure is spherical and is of moderate size to withstand the required pressure while reducing the space and cost of providing containment.

In order to minimize the size of the containment structure yet limit peak containment pressure, one or more suppression tanks are provided within the containment structure. Steam in the containment structure resulting from the LOCA is directed into and condensed by water in the suppression tank or tanks. Should the heat exchanger not be able to provide sufficient cooling to reduce the reactor pressure vessel such that the reactor core remains covered and cooled, the water in the suppression tank can be transferred, such as by gas pressure, to a flood-up cavity in which the lower portion of the reactor pressure vessel containing the reactor core is located to provide additional core cooling. The gas pressure is built up in the suppression tank by gas filling the containment structure which is forced into the suppression tank along with the steam by the initial high pressure in the containment structure resulting from the LOCA. Alternatively, or in addition, water in the suppression tank or tanks can be gravity fed into the reactor pressure vessel to keep the reactor core covered by mounting the tank or tanks above the reactor core. In an especially advantageous arrangement the gas from the containment structure and the steam resulting from the LOCA are introduced into the water in the suppression tank or tanks at a height which allows the water above the injection point to be transferred by gas pressure to a flood-up cavity in which the lower portion of the reactor pressure vessel containing the reactor core is located to provide additional core cooling when the pressure in containment falls, while leaving the remaining water for selective gravity feeding into the reactor pressure vessel. As a further alternative, water in the now flooded flood-up cavity will be at an elevation higher than the reactor core and can gravity drain into the reactor pressure vessel to keep the reactor core covered and cooled.

As an additional alternative cooling arrangement, a cooling fluid can be directed by a shroud over the external surface of the containment structure. This cooling of the external surface of the containment structure is limited if the heat exchangers reduce the reactor pressure vessel pressure and therefore containment structure pressure. However, in the event the heat exchangers do not remove heat and the containment structure pressure and temperature remain elevated, the external cooling is more effective and will limit the containment structure pressure to less than its design pressure thus providing a diverse means of limiting the containment structure pressure. As yet another alternative, the containment structure internal structure is arranged such that steam condensed on the inside surface of the shell cooled by external fluid will drain by gravity to the flood-up cavity. This condensed steam will flood the flood-up cavity to above the reactor core elevation such that the flood-up water can drain by gravity through a provided transfer path to the reactor vessel thereby keeping the reactor core covered with water and cooled. This method of cooling the reactor core together with the external cooling of the containment structure is diverse from the heat exchanger provided reactor core cooling.

BRIEF DESCRIPTION OF THE DRAWINGS

A fill understanding of the invention can be gained from the following description of the preferred embodiments when read in conjunction with the accompanying drawings in which.

DESCRIPTION OF THE PREFERRED EMBODIMENTS

Figure 1:
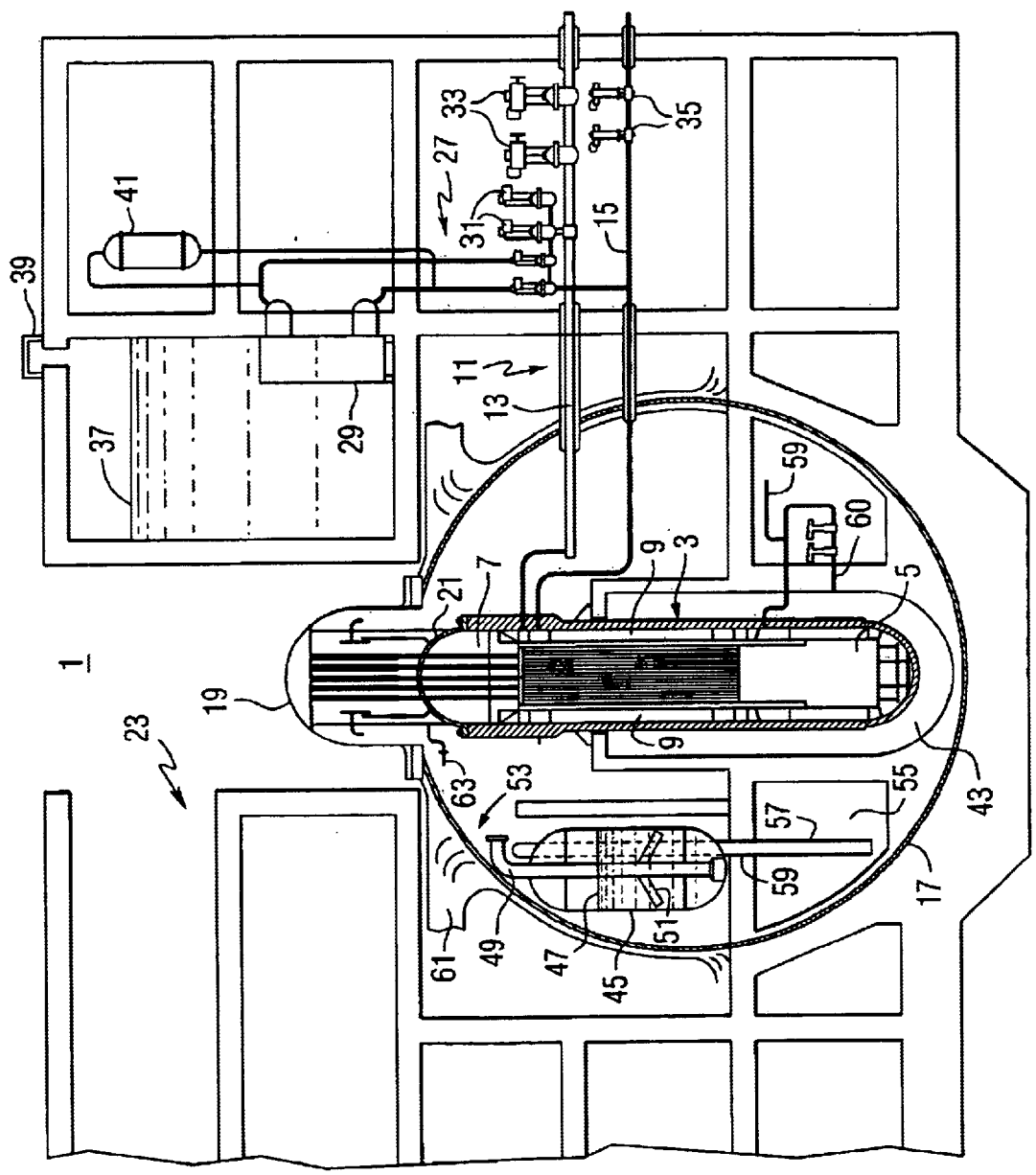
FIG. 1 is an elevation view of a containment structure, reactor pressure vessel, suppression tank or tanks, and external heat exchangers attached to the steam generator secondary circuit comprising the pressurized water reactor (PWR) in accordance with the invention.
Figure 2:
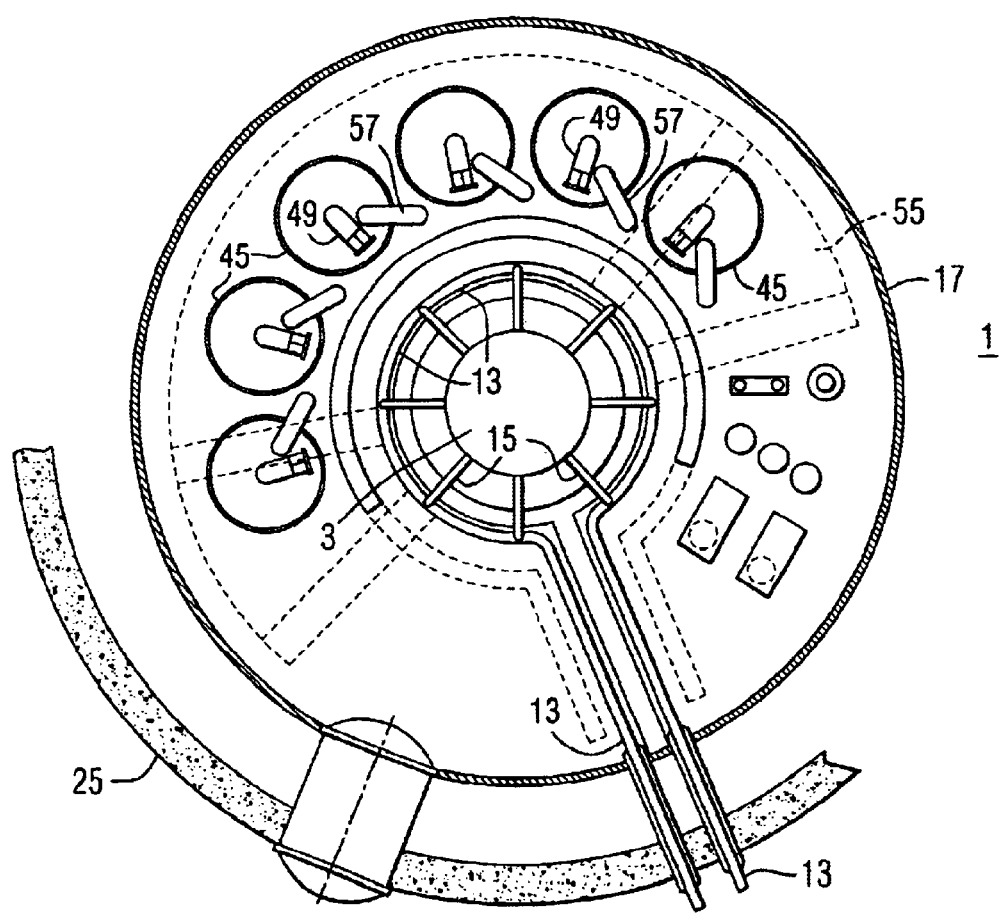
FIG. 2 is a plan view of the PWR of FIG. 1.

Referring to FIGS. 1 and 2, the pressurized water reactor (PWR) 1 in accordance with the invention has an integrated reactor pressure vessel 3 which houses the reactor core 5, an integral pressurizer 7, and at least one, but in fact a plurality, of steam generators 9, all in one vessel. With this arrangement, the reactor coolant, in the form of light water, can be circulated through the reactor core 5 and steam generators 9 by reactor coolant pumps (not shown) included in the integral reactor pressure vessel, although natural circulation can be used if desired so that reactor coolant pumps are not required. In the exemplary PWR 1 shown, there are four steam generators 9; however, there may be more or fewer as needed. These steam generators 9 have secondary circuits 11 which include a steam line 13 leading out to a turbine generator (not shown), and a return feedwater line 15. These secondary circuits 11 can be independent for each of the steam generators 9, or can be ganged such as shown in exemplary PWR where, as can be seen in FIG. 2, the steam generators are paired so that there are two steam lines 13 and two feedwater lines 15.

The integral type reactor pressure vessel eliminates the large loop piping that is normally used to connect the individual components, and thus eliminates the possibility of a large LOCA. The systems and structures provided in the novel PWR 1 make it possible to maintain reactor pressure vessel water inventory following all other credible LOCAs without the need for safety injection, that is without requiring water addition.

The integrated reactor pressure vessel 3 is housed in a relatively small, high pressure containment structure 17. In the exemplary embodiment of the PWR 1, this containment structure 17 is a spherical steel containment vessel having a diameter of 20 meters. The containment structure is constructed of standard thickness steel, typically one and three-quarter inches, and due to its small diameter and physical shape, can be designed for a much higher pressure than typical PWR containments. For example, this 20 meter diameter containment structure can have a design pressure of approximately 220 psig, compared to the approximately 55 psig in a 40 meter diameter, cylindrical steel containment. The containment structure 17 is sized to contain the integral reactor pressure vessel 3, a limited amount of equipment for reactor operation, and just enough room for personnel access required for inspection and maintenance activities. The containment vessel 17 includes a flanged closure head 19 at the top, which is removed to provide access for removing the reactor pressure vessel head 21 for reactor core refueling/ replacement operations. The containment structure head, reactor pressure vessel internals, and fuel is removed from the reactor pressure vessel directly up into a fuel building 23 which is located above the containment vessel. Because this reactor pressure vessel has no external steam generators, reactor coolant pumps, pressurizer, and connecting piping loops and because the refueling cavity and associated refueling equipment (not shown), and heavy lift crane (not shown) are located outside of the containment vessel 17, the size of the containment vessel can be minimized. This permits the size of the surrounding shield building 25 and structures to be greatly reduced, thereby contributing to a reduction in the overall cost of the PWR.

In accordance with the invention, the PWR 1 includes a reactor safety system 27, which performs the functions of maintaining the reactor core/reactor pressure vessel water inventory, transferring reactor sensible heat and core decay heat to the environment, limiting containment peak pressure and reducing this pressure in the long term. This safety system is greatly simplified as compared to existing safety system designs. Furthermore, the safety system 27 and structures to be described provide two independent and diverse methods of maintaining core cooling and containment integrity. The safety system also results in enhanced reactor safety; that is, the probability of reactor core damage and the release of radioactivity is reduced compared to current reactor designs.

The safety system 27 includes an arrangement and method of removing heat from the reactor pressure vessel 3 that operates for all postulated events and provides both reactor core and containment cooling. This heat removal method works in conjunction with the design of the containment structure such that no reactor core 3 uncoverary occurs following any credible LOCA, even if no makeup water is provided to the reactor. This elimination of the need for make-up to the reactor pressure vessel 3 is only obtainable with the integral reactor pressure vessel. The steam generators 9 provide the in-reactor pressure vessel heat transfer surface. Cooled water is supplied to the steam generators 9 from one or more heat exchangers 29 connectable to the feed water lines 15 and the steam lines 13 through valves 31 located between the steam generators and the main steam isolation valves 33 and main feed water isolation valves 35. Again, separate heat exchangers 29 can be provided for each steam generator or sets of ganged steam generators. The one or more heat exchangers 29 are immersed in a pool of water 37 stored in the shield building 25. This cooling water supply can boil off through a vent 39, and being located outside of the containment structure 17 can be replenished as necessary. A separate tank 41 provides additional water as needed for the steam generators.

In the event of a LOCA, the resultant blowdown as reactor coolant water flashes to steam causing the pressure in the containment structure 17 to rise rapidly. The limited size and pressure withstanding capability of the containment structure 17 limit the mass of coolant that can escape the reactor pressure vessel 3 and therefore the reactor core 5 remains covered. The containment structure 17 and the heat exchangers 29 are sized to reduce the temperature within the reactor pressure vessel, so that the pressure within the reactor pressure vessel 3 falls below the pressure in the containment structure 17 to further limit and reverse the mass flow of coolant from the reactor pressure vessel to the coolant structure 17. The mass flow of steam back into the reactor pressure vessel results in an increase in the reactor coolant level within the reactor vessel through condensation produced by the cooling effect of the steam generators. Referring again to FIG. 1, it will be noticed that the lower portion 31 of the reactor pressure vessel 3 containing the reactor core 5 is located in a flood-up cavity 43 in the containment structure 17. This flood-up cavity provides a confined volume which can be easily filled with the discharged reactor coolant and/or with another water source described below to an elevation above the top of reactor core 5. This flood-up water is able to keep the core covered should the LOCA occur below the level of the reactor core.

In order to limit the peak pressure within the containment structure 17, at least one suppression tank 45 is provided inside the containment structure 17. As can be observed from FIG. 2, in the exemplary PWR 1, six suppression tanks 45 are provided within the containment structure 17. Each of these suppression tanks 45 contains a volume of water 47. Steam which escapes into the containment structure 17 is directed into the water in the suppression tank where it is condensed by a pipe 49 having an upper end open to the interior of the containment structure 17 and a lower end equipped with a device such as a sparger 51 positioned below the surface of the water 47. This system is designed to limit the peak pressure in the containment structure 17 to a limit value such as 1 MPa (130 psig) following the largest postulated LOCA. Gas in the suppression tanks 45 above the water 47 is compressed as gas and steam from the containment structure is forced into the suppression tank. Rather than venting this compressed gas as in prior practice, the pressure is maintained so that as the pressure within the containment structure 17 falls below the pressure of the compressed gas, the portion of the water 47 above the sparger 51 is transferred out of the pipe 49 and drains into the flood-up cavity 43 to make available additional cooling water for the reactor core 5. Thus, the compressed gas above the water 47, the pipe 49 and the path by which this water drains into the flood-up cavity 43 form a transfer path 53 for transferring water from the suppression tanks once it has served its purpose in limiting the peak containment pressure for additional use in providing additional cooling for the reactor core. In order to limit the pressure that builds up within the suppression tanks, thereby allowing more steam to be condensed, a pressure well 55 is formed in the containment structure 17 and connected to the top of the suppression tanks by pipes 57. Alternatively, the suppression tank(s) can be made larger such that gas space above the water 47 is larger to accomplish this pressure limitation.

Should the steam generator heat removal system described above not be effective in maintaining sufficient reactor coolant inventory in the reactor pressure vessel 3 to keep the core covered 5, water in the suppression tanks 45 can be fed into the reactor pressure vessel at a point above reactor core 5 through piping 59. The full length of the piping 59 is not shown in FIG. 1 for clarity. The suppression tanks 45 are mounted in the containment structure 17 at a level above the reactor core, so that this makeup water from the suppression tanks can be gravity fed to the reactor pressure vessel 3. The height of the sparger 51 in the suppression tank is determined so that only a first predetermined amount of the water 47 above the sparger 51 is automatically passively transferred to the flood-up cavity 43, thereby always leaving a second amount of water below the sparger 51 for gravity fed makeup water, if necessary.

The containment structure 17 is cooled by the natural circulation of air up along the outside of the containment structure as guided by a shroud 61. This cooling is very modest following events where the steam generators remove heat and quickly reduce containment pressure. However, if steam generator cooling is ineffective, the containment pressure and temperature will become sufficiently elevated for air cooling of the external surface of the containment structure to remove enough heat to prevent the containment pressure from exceeding design pressure. This external cooling of the containment structure 17 is diverse to the first line of defense steam generator cooling feature. For application to reactor designs with a power greater than about 300 MWt, the external air cooling may need to be supplemented by also applying water to the outside of the containment structure 17, as is known.

Analysis and Operation

Initial accident analyses were done for a series of LOCA events as these were the limiting events for establishing the containment structure, containment pressure suppression, and steam generator heat removal performance parameters. The analyses were performed for a reactor with a 300 MWt output and with the following component parameters:

Four independent heat removal heat exchangers 29 submerged in an elevated pool of water 37 located outside of the containment structure 17. These heat exchangers 29 each had a supply line connected to one of four steam generator steam lines upstream of the steam line isolation valves 33. Each heat exchanger 29 return line was connected to one of the four feed water lines 15 outside of containment and downstream of the water isolation valves 35. These heat exchangers were designed to remove a total of 18.5 MWt from the primary system at normal operating temperature using only natural circulation driving forces. They were designed for high pressure operation so that they could be used for passive heat removal following any loss of normal heat sink.

The containment suppression pool consisted of six small tanks 45 that were partially filled with water 47. A total of 150 M$^3$ was provided. These tanks were connected to the 300 M$^3$ suppression gas space 55. This arrangement allowed the suppression water to be located at an elevation higher than the reactor core 5 so that water could drain from the suppression tanks 45 for gravity to the reactor pressure vessel 3.

Redundant one-inch flow paths 59 and 60 from the suppression pool of water 47 and from the flood-up cavity 43, respectively, to the reactor pressure vessel 3 were provided, these paths were opened by a safety parameter such as very low reactor pressure vessel level to provide gravity driven core makeup water to ensure that the reactor core 5 remains covered for an indefinite time following the postulated LOCAs.

Small, redundant reactor pressure vessel depressurization flow paths 63 were included to help equalize the pressure between the reactor pressure vessel 3 and the containment structure 17 following the postulated LOCA located at or below the core elevation and to prevent the possibility of high pressure core melt scenarios and were determined to be two-inch in size.

The exposed 6,000 ft$^2$ area of the 20 meter diameter containment shell 17 cooled by the natural circulation of air, was verified to prevent the containment from exceeding design pressure even if all four of the steam generator heat removal subsystems were assumed to fail to provide heat removal.

Four-Inch Break at Reactor Pressure Vessel Piping

Due to the absence of any primary loop piping, the PWR 1 will have no piping connections larger than 2.6 inches in diameter. A break equivalent to a pipe four inches in diameter was assumed for conservatism in the analysis, and the break location at 12.5 meters from the bottom of the reactor pressure vessel 3 represents the expected pipe connection elevation. In addition to the conservative break size, the analysis assumed that there was no safety injection water provided to the reactor pressure vessel via gravity makeup flow path. This represented a very conservative case for long term coil cooling.

Figure 3:
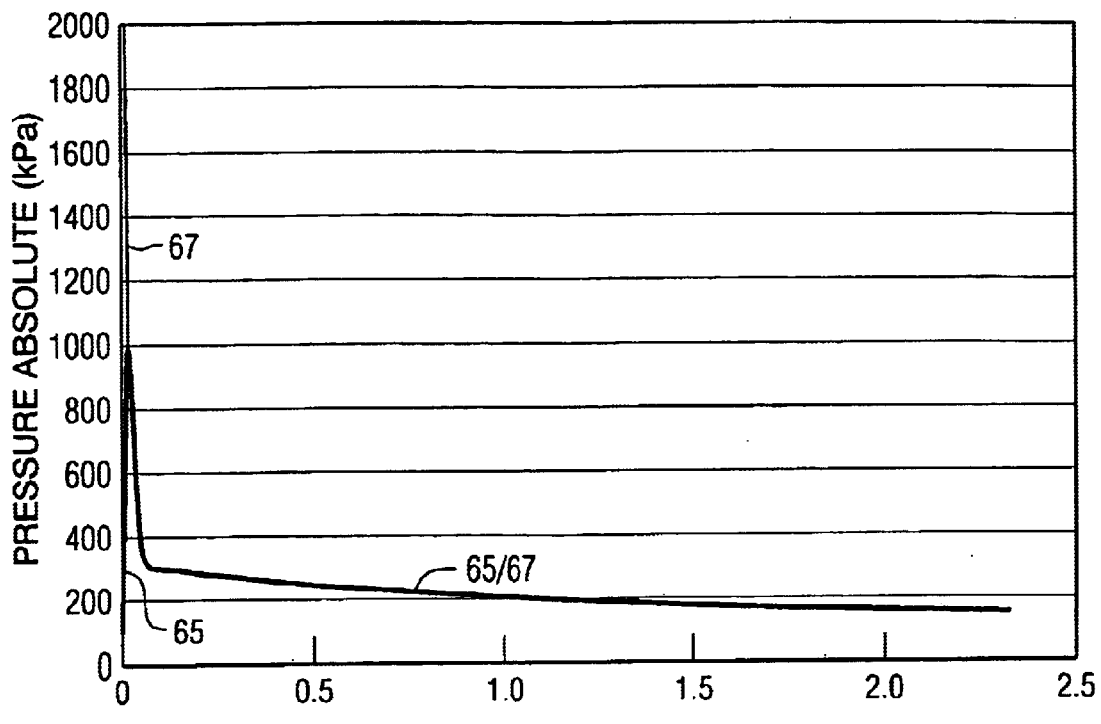
FIG. 3 is a graph illustrating containment and reactor pressure vessel versus time for a postulated LOCA in the PWR resulting from a four inch break.
Figure 4:
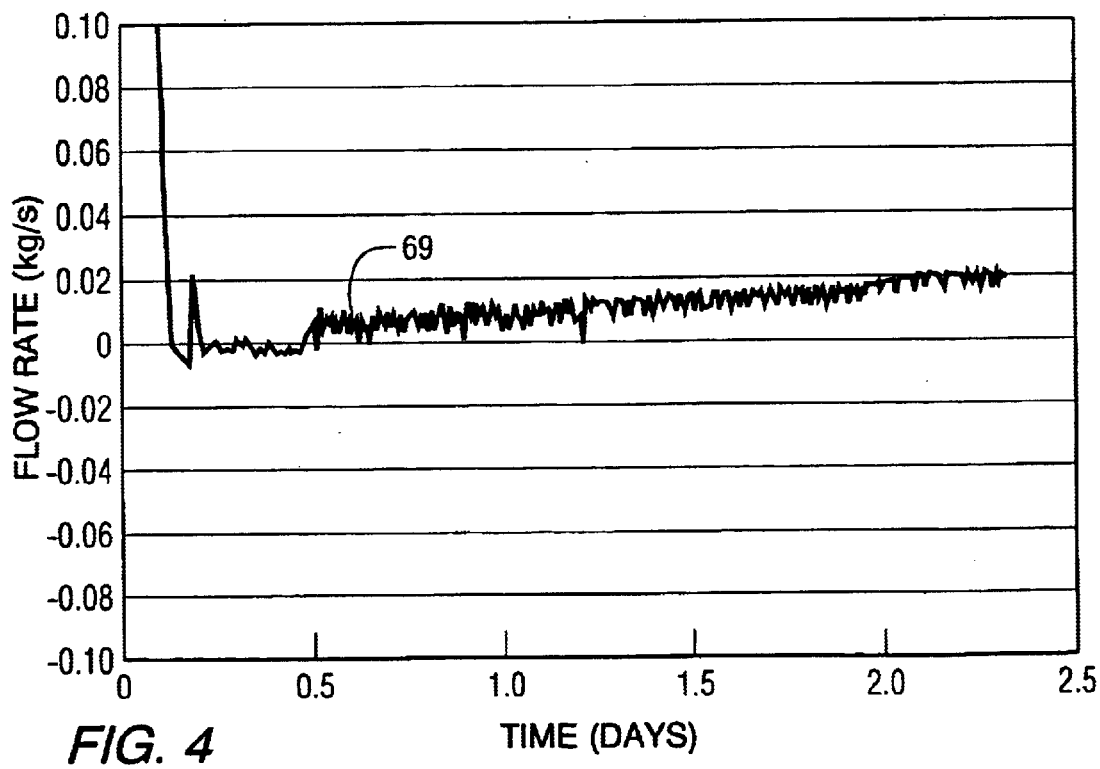
FIG. 4 is a graphical representation of break flow versus time for the postulated LOCA.

FIG. 3 illustrates the containment pressure 65 and reactor pressure vessel 67 versus time following the four-inch break. Reactor pressure vessel pressure 67 is shown to quickly decrease from the normal operating pressure due to the rapid blowdown of steam and water from the reactor pressure vessel 3, and containment pressure 65 rapidly rises. The containment pressure 65 peaks at approximately 1 MPa (130 psig) at approximately 1600 seconds and then decreases together with the reactor pressure vessel pressure 67. Note that the containment pressure 65 continues to decrease along with the reactor pressure vessel pressure 67 even though there is very limited heat removal from the containment structure (air cooling of the external surface only). This is due to the fact that the steam within the reactor pressure vessel 3 is being condensed by the heat removal by way of the steam generators 9, which reduces the reactor pressure vessel pressure 67, and effectively stops the loss of mass from the reactor pressure vessel 3. In fact, the reactor pressure vessel pressure 67 is actually lower than the containment pressure 65 for a significant period of time. This is illustrated by FIG. 4 which shows the break flow rate 69 versus time. Under the postulated conditions, there is some initial liquid flow, but for the scale shown in FIG. 4, the break flow represented is steam flow. The break flow rate decreases rapidly as the reactor pressure vessel pressure 67 and the containment pressure 65 equalize. This is followed by a period of time (from about 2 to 12 hours) where the break flow is actually negative; i.e. steam (and incondensable gas) is being drawn into the reactor pressure vessel 3 and the condensed steam results in an increase in reactor pressure vessel liquid mass versus time.

Figure 5:
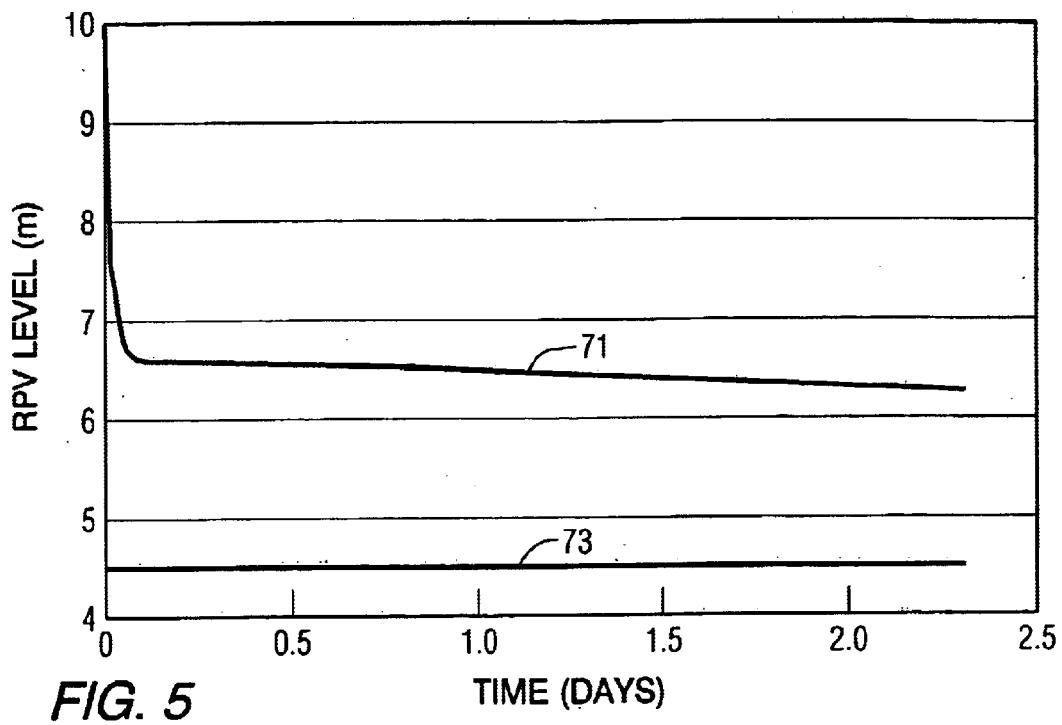
FIG. 5 is a graphical representation of reactor vessel level versus time for the postulated LOCA.

After 12 hours the heat removal inside the reactor pressure vessel 3 by way of the steam generators 9 becomes slightly less than the core boil-off rate, and the break flow again becomes positive and the reactor pressure vessel mass inventory decreases. This occurs because some heat is being removed from the containment vessel by cooling air on the external surface of the containment structure 17. However, due again to the continued heat removal from within the reactor pressure vessel 3, the pressure difference between the reactor pressure vessel and the containment structure is very small and therefore the break flow rate is very small. FIG. 5 shows the resulting reactor pressure vessel liquid level 71 versus time compared to core height 73. Note that the reactor pressure vessel level is maintained well above the top of the reactor core 3, which is at 4.5 meters above the bottom of the reactor pressure vessel 3. In fact, the reactor pressure vessel level only decreases from about 6.7 meters at 2 hours to 6.2 meters at 2.3 days after the LOCA initiation. Again, it is emphasized that this level decrease is calculated with no credit with gravity driven makeup flow from the elevated suppression water tanks 45 or from the flooded flood-up cavity 43.

Two-Inch Break at 6.5 Meters Above the RV

Figure 6:
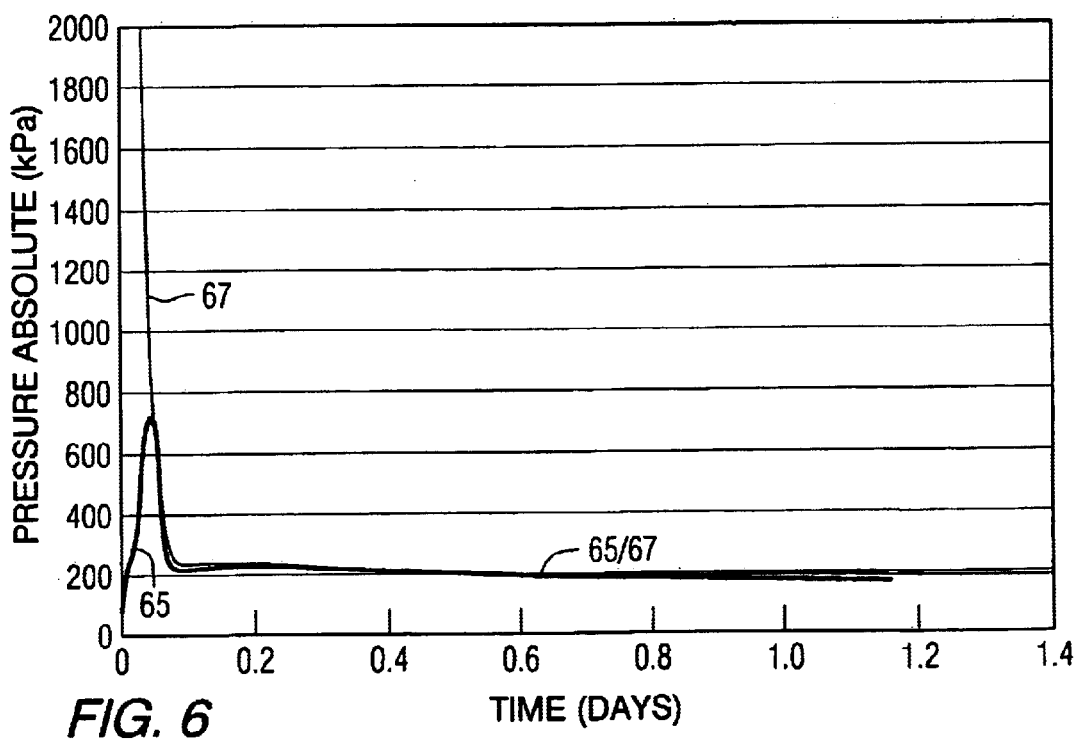
FIGS. 6–8 are graphs showing corresponding conditions to those in FIGS. 3–5, but for a two inch break.

This break corresponds to a postulated break of a long-term core makeup pipe 69. This pipe 69 connects to the reactor pressure vessel 3 at 6.5 meters above the bottom of the reactor pressure vessel 3, but is still within the flood-up cavity 43. The pipe size is conservatively assumed to be two inches in diameter, although the actual diameter is expected to be less than one inch. FIG. 6 illustrates the containment pressure 65 in the reactor pressure vessel pressure 67 versus time following the break. The reactor pressure vessel pressure 67 is shown to quickly decrease from a normal operating pressure due to the rapid blowdown of water from the reactor pressure vessel 3, and containment pressure 65 rapidly rises. The containment pressure peaks at approximately 0.7 MPa (90 psig) at approximately 4000 seconds, and then decreases together with the reactor pressure vessel pressure 67 and is maintained at about 0.2 MPa (15 psig) after 2.5 hours. Again, note that the containment pressure 65 is decreased even through there is very limited heat removal from the containment (external surface air cooling only).

Figure 7:
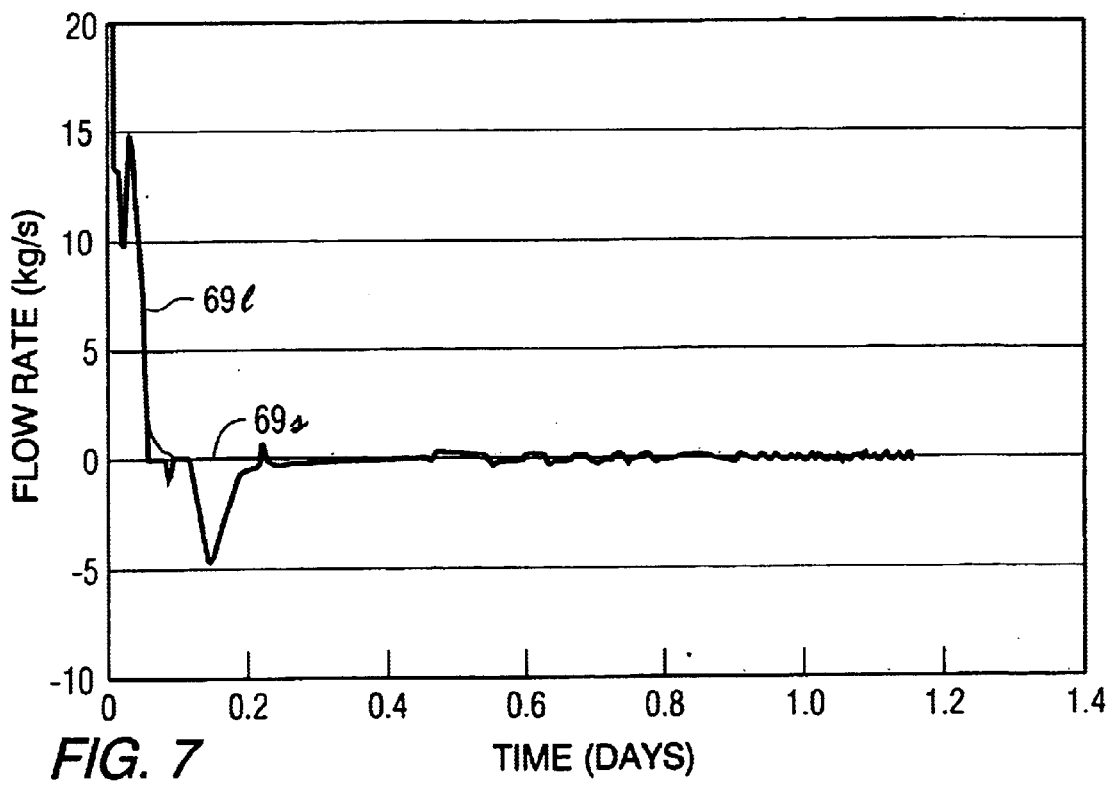
Figure 8:
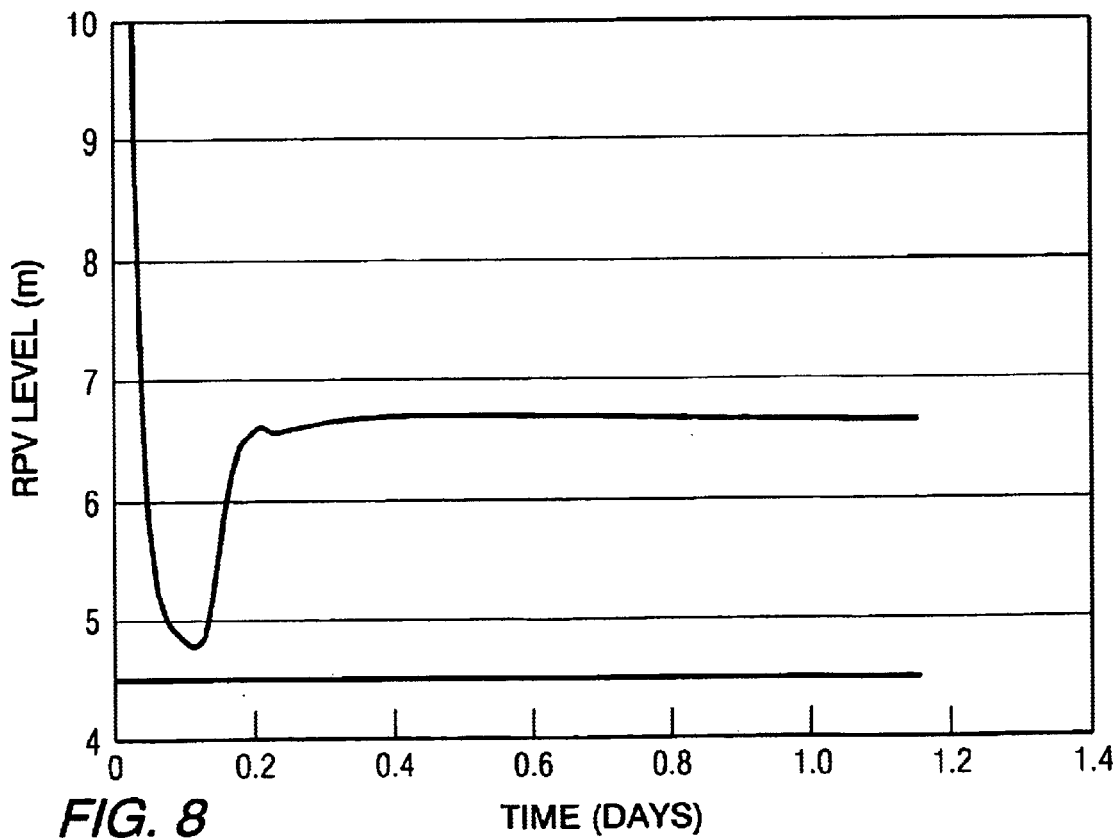

Because the break location is very low on the reactor pressure vessel 3, the mass loss from the reactor pressure vessel remains relatively high until the break is uncovered and steam flows from the reactor pressure vessel through the break. This high break flow results in the reactor pressure vessel level falling to the approximately 4.8 meter elevation before the reactor pressure vessel pressure 67 and containment pressure 65 equalize and the loss of mass flow from the reactor pressure vessel 3 stops. For this break location, there is a significant reverse break flow rate when the reactor pressure vessel pressure 67 is reduced below the containment pressure 65 since water flows from the flooded flood-up cavity 43 back into the reactor pressure vessel 3 via the break. This is illustrated in FIG. 7, which shows the break flow rate versus time, and in FIG. 8, which shows reactor pressure vessel water level versus time. In FIG. 7, liquid flow rate is represented by the trace 69l and steam flow rate by the trace 69s. The large negative break flow rate (water flow into the reactor pressure vessel 3) results in an increase in reactor pressure vessel liquid level to almost the 7 meter elevation at about 5 hours. This level corresponds to the flood-up cavity flood-up level. In the longer term, FIGS. 7 and 8 show that the break flow rate is zero and the reactor pressure vessel level is maintained. This transient is shown for only 1.2 days because this level is maintained by the flow from the flood-up cavity 43 through the submerged break.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of operating a pressurized water reactor having a containment structure containing an integral reactor comprising at least one steam generator mounted together with a reactor core in a pool of reactor coolant in a reactor pressure vessel and with the at least one steam generator having a secondary loop extending outside of the containment structure, the method comprising:

in response to a loss coolant accident resulting in a mass flow of reactor coolant out of the reactor pressure vessel into the containment structure, circulating cooling fluid through the secondary circuit of the at least one steam generator to withdraw heat from the reactor pressure vessel and thereby condense steam within the reactor pressure vessel; and extracting the heat from the cooling water outside of the containment structure at a rate which, within no more than about 3 hours, condenses sufficient steam in the reactor pressure vessel to lower pressure in the reactor pressure vessel to a pressure at or below pressure in the containment structure resulting from the loss of coolant accident and thereby stopping or reversing the mass flow of reactor coolant from the reactor pressure vessel whereby the reactor core remains covered without the addition of water from other sources to the reactor pressure vessel.

2. The method of claim 1 comprising the further steps of:

including at least one suppression tank containing water in the containment structure;

introducing steam in the containment structure resulting from the loss of coolant accident into the water in the at least one suppression tank to condense the steam; and selectively transferring water from the at least one suppression tank to the reactor pressure vessel to keep the reactor core covered with water.

3. The method of claim 2 including mounting the at least one suppression tank above the reactor core and transferring the water to the reactor pressure vessel by gravity.

4. The method of claim 3 further comprising:

disposing a lower portion of the reactor pressure vessel containing the reactor core in a flood-up cavity in the containment structure;

using gas in the at least one suppression tank above the water, which gas is compressed by the addition of a gas/steam mixture from the pressurized containment structure to passively transfer at least some water in the at least one suppression tank to the flood-up cavity.

5. The method of claim 4 wherein the step of introducing the steam into the at least one suppression tank comprises introducing the gas/steam mixture from the containment structure at a level selected to transfer a first portion of the water in the at least one suppression tank to the flood-up cavity leaving a remaining portion of the water in the at least one suppression tank for selective transfer to the reactor pressure vessel by gravity.

6. The method of claim 1 including disposing the lower portion of the reactor pressure vessel containing the reactor core in a flood-up cavity in the containment structure and including at least one suppression tank in the containment structure, introducing steam in the containment structure resulting from the loss coolant accident and gas in the containment structure into the water in the at least one suppression tank to condense the steam, and selectively using the gas in the at least one suppression tank, compressed during the condensing of steam by the gas added from the containment structure, to passively transfer water from the at least one suppression tank to the flood-up cavity.

7. The method of claim 6 further including constructing the containment structure from steel and directing a flow of a cooling fluid over an external surface of the containment structure to provide diverse cooling and depressurization of the containment structure whereby steam is condensed on the internal surface of the containment structure and returns to the reactor vessel flood-up cavity where it is available for cooling the reactor core.

8. The method of claim 1 including:

selectively venting steam from an upper portion of the reactor pressure vessel into the containment structure to ensure equalization of reactor pressure vessel pressure and containment structure pressure at a rate such that following a break in a lower portion of the reactor pressure vessel, reactor pressure vessel water level does not fall below the top of the reactor core.

9. The method of claim 1 including:

disposing a lower end of the reactor pressure vessel containing the reactor core in a flood-up cavity in the containment structure;

providing a supply of water in the containment structure to fill the flood-up cavity to a level above the top of the reactor core; and selectively transferring water from the flood-up cavity to the reactor pressure vessel above the reactor core by gravity.

10. A method of operating a pressurized water reactor having a containment filled with an incondensable gas and containing an integral reactor comprising at least one steam generator mounted together with a reactor core in a pool of reactor coolant in a reactor pressure vessel, the method comprising:

including at least one suppression tank containing water in the containment structure; and in response to a loss of coolant accident, introducing the incondensable gas in the containment structure together with steam in the containment structure resulting from the loss of coolant accident into the water in the at least one suppression tank to condense the steam and compress the incondensable gas; and selectively transferring water from the at least one suppression tank to the reactor pressure vessel to keep the reactor core covered with water by reducing pressure in the reactor pressure vessel by removing heat directly from the reactor pressure vessel to outside the containment structure thereby lowering pressure in the containment structure and allowing the compressed incondensable gas; in the suppression tank to push the water from the suppression tank into the reactor pressure vessel.

11. The method of claim 10 wherein the step of including at least one suppression tank comprises mounting the at least one suppression tank within the containment structure above the reactor core, and the step of selectively transferring water comprises selectively transferring water from the at least one suppression tank to the reactor pressure vessel by gravity.

12. A method of operating a pressurized water reactor having a containment structure filled with an incondensable gas and containing an integral reactor comprising at least one steam generator mounted together with a reactor core in a pool of reactor coolant in a reactor pressure vessel, the method comprising:

disposing a lower portion of the reactor pressure vessel containing the reactor core in a flood-up cavity in the containment structure;

including at least one suppression tank containing water in the containment structure; and in response to a loss of coolant accident, introducing the incondensable gas in the containment structure together with steam in the containment structure resulting from the loss of coolant accident into the water in the at least one suppression tank to condense the steam and compress the incondensable gas; and selectively transferring water from the suppression tank to the flood-up cavity by reducing pressure in the reactor pressure vessel by removing heat directly from the reactor pressure vessel to outside the containment structure thereby lowering pressure in the containment structure and allowing the compressed incondensable gas in the suppression tank to push water from the suppression tank into the flood-up cavity.

13. The method of claim 12 including transferring some of the water in the at least one suppression tank into the reactor pressure vessel.

14. The method of claim 13 wherein the at least one suppression tank is mounted in the containment structure above the reactor core and some of the water in the at least one suppression tank is transferred into the reactor pressure vessel by gravity.

15. The method of claim 14 wherein the incondensable gas and steam from the containment structure are introduced into the water in the at least one suppression tank at a level in the at least one suppression tank to transfer a selected amount of the water to the flood-up cavity using the incondensable gas compressed during the condensing of the steam in the at least one suppression tank and leaving a remaining amount of water in the at least one suppression tank for selective transfer by gravity to the reactor pressure vessel.

* * * * *